United States Patent
Miura

Patent Number: 6,074,061
Date of Patent: Jun. 13, 2000

[54] PROGRESSIVE FOCAL LENS FOR EYEGLASSES

[75] Inventor: Hitoshi Miura, Okazaki, Japan

[73] Assignee: Tokai Kagagu Kabushiki Kaisha, Aichi-ken, Japan

[21] Appl. No.: 09/176,592

[22] Filed: Oct. 21, 1998

[30] Foreign Application Priority Data

Oct. 23, 1997 [JP] Japan .................................. 9-290840

[51] Int. Cl.$^7$ .................................................. G02C 7/06
[52] U.S. Cl. ................................................................ 351/169
[58] Field of Search ................................... 351/168, 169, 351/177

[56] References Cited

U.S. PATENT DOCUMENTS

| | | | |
|---|---|---|---|
| 5,708,493 | 1/1998 | Ahsbahs et al. | 351/169 |
| 5,710,615 | 1/1998 | Kitani | 351/169 |
| 5,745,211 | 4/1998 | Mukaiyama et al. | 351/169 |
| 5,926,250 | 7/1998 | Mukaiyama et al. | 351/169 |

*Primary Examiner*—Huy Mai
*Attorney, Agent, or Firm*—Crompton, Seager & Tufte, LLC

[57] ABSTRACT

A focal lens for eyeglasses includes a distance area located at an upper part of the lens, a reading area located at a lower part of the lens, and a progressive area located between the distance area and the reading area. A meridional line extends generally vertically through a center of the lens and separates the lens into a nose-side area and an ear-side area. The meridional line is shifted toward the nose-side area in the progressive area and the reading area. Equi-stigmatism curves are arranged in both the nose-side area and the ear-side area, with the distribution of the astigmatism on the ear-side being asymmetrical to the distribution of astigmatism on the nose-side. The astigmatism in the progressive area increases more slowly toward the nose-side than the astigmatism directed toward the ear-side. The progressive area includes vertical distortions which are slightly greater on the nose-side than on the ear-side at an upper part and slightly smaller on the nose-side than on the ear-side at a lower part of the progressive area.

19 Claims, 9 Drawing Sheets

PROGRESSIVE FOCAL LENS FOR EYEGLASSES

BACKGROUND OF THE INVENTION

1. Field of the Invention

The present invention generally relates to a progressive focal lens and eyeglasses using the same, and, more particularly, to a progressive focal lens which provides improved near vision.

2. Description of the Related Art

Reduced resilience of the eye lenses of old people lowers their ability of adjusting focal length. To compensate for this reduced power of accommodation, myopic eyeglasses (presbyopic eyeglasses) are used. When the wearers do not need myopic eyeglasses, the wearers take off the eyeglasses or replace the eyeglasses with hyperopic eyeglasses. Due to the inconvenience of changing between myopic eyeglasses and hyperopic eyeglasses, progressive focal lenses that allow a single pair of eyeglasses to be used for both hyperopic and myopic usages would be advantageous.

As shown in FIG. 1, a typical progressive focal lens 11A has a distance area 13 located at an upper portion of the lens, a reading area 14 located at an lower portion of the lens, and an intermediate area or progressive area 15 positioned between the distance area 13 and the reading area 14. More specifically, the lens 11A has a principal meridional line 12 and a geometric center 01. A distance point 02 is provided on the principal meridional line 12 above the geometric center 01, and a reading point 03 is provided on the principal meridional line 12 below the geometric center 01. The distance area 13 is defined above a first horizontal line L1 that passes through the distance point 02. The distance area 13 has a spherical shape or a near spherical shape. The reading area 14 is defined below a second horizontal line L2 that passes through the reading point 03. The progressive area 15 is defined between the lines L1 and L2.

The progressive area 15 has an aspherical shape and a curvature that gradually changes from the curvature for the distance vision to the curvature for the near vision. The aspherical shape produces distortion. The distortion causes a person wearing the eyeglasses to encounter horizontal distortion when the line of sight is shifted vertically or results in a change in the size ratio of an object viewed when the line of sight is shifted horizontally. When the line of sight passes the progressive area 15, therefore, reeling occurs, causing the wearer to feel uncomfortable. Because astigmatism associated with distortion is present in the progressive area 15, an object being viewed may be blurred.

Japanese Patent Publication No. Hei 1-5682 proposes a progressive focal lens which provides comfortable binocular side vision close to that of a naked eye in consideration of the action of a wearer to turn his head to view the sides with both eyes.

This progressive focal lens will be discussed in detail below. As shown in FIG. 2, a part of the principal meridional line 12 that lies in the progressive area 15 and the reading area 14 is shifted by a predetermined distance toward the nose side as indicated by the broken line 121. The distribution of astigmatism is horizontally asymmetrical about this shifted principal meridional line 121 in the area which lies within 15 mm horizontally toward the nose side and the ear side from the shifted principal meridional line 121. The horizontal asymmetry is indicated by equi-astigmatism curves 21 and 22. Further, an increase in astigmatism toward the ear side in the reading area 14 and the progressive area 15 is slower than an increase in astigmatism on the nose side.

When eyeglasses are used, as shown in FIG. 3, the moving angle $\theta_1$ of the line of sight on the ear side is greater than the moving angle $\theta_2$ of the line of sight on the nose side. Due to the slower increase in astigmatism on the ear side in this progressive focal lens, reeling of an object to be viewed at the time of moving the line of sight on the ear side is suppressed. When the wearer views a stationary object 23 through the reading area 14 and the progressive area 15, however, the nose sides of the lenses 11A are used most. In near vision, a wearer frequently sees something in front of the face and between both eyes. In near vision, therefore, it is desirable that astigmatism and distortion in the nose-side area should be small. However, the progressive focal lens 11A has a large change in astigmatism in the nose-side area in near vision. This progressive focal lens 11A therefore causes problems, such as blurring of the object 23, in addition to large distortion and large reeling caused by movement of the line of sight.

To view an object which lies rightward of the right eye or leftward of the left eye at a close distance, it is natural for a person to turn their head to view the object directly. This allows the person to see the object more clearly with both eyes. As the progressive focal lens 11A has the reading area 14 narrower than the distance area 13, it is customary for the wearer of eyeglasses using the progressive focal lenses 11A to see the object in front of the face in near vision. Further, the area of the progressive focal lens 11A that is located on the nose side, rather than the area near the principal meridional line 12 is frequently used in near vision. Thus, the principal meridional line 12 is shifted toward the nose side in association with convergence. In this case, the convergence corresponds to the distance of clear vision (about 30 cm). In real life, people using the progressive focal lenses 11A are apt to see objects lying closer than 30 cm. It is therefore desirable that astigmatism and distortion in the nose-side area, which is frequently used, be smaller.

Japanese Unexamined Patent Publication No. Hei 3-230114 discloses a progressive focal lens which has the principal meridional line 12 horizontally asymmetrical in the reading area 14 and the progressive area 15 and the maximum astigmatism on the ear side in the reading area 14 is equal to that on the nose side, as shown in FIG. 4. In addition, vertical distortion $\delta_1$ on the ear side in the reading area 14 and the progressive area 15 is smaller than vertical distortion $\delta_2$ on the nose side as shown in FIGS. 5 and 6. That is, the curvature in the reading area 14 is greater on the nose side than on the ear side. The reason for making distortion on the ear side smaller than that on the nose side is that when the neck is moved right and left, a new image comes from the ear side.

The wearer views the nearby object 23 through the reading area 14 and the progressive area 15 on the nose side of the lens. When the wearer sees the object 23 over the area that extends from the progressive area 15 to the reading area 14, therefore, large distortion occurs in the vertical direction of the image of the object 23. This distortion undesirably increases the asthenopia.

Accordingly, it is an objective of the present invention to provide a progressive focal lens that permits an improved near vision in the nose-side area.

SUMMARY OF THE INVENTION

In one aspect of the invention, a progressive focal lens includes a distance area located at an upper portion of the lens, a reading area located at a lower portion of the lens, a progressive area located between the distance area and the reading area, and a principal meridional line extending vertically at a center portion of the lens and crossing the distance area, the reading area and the progressive area. A nose-side area and an ear-side area are defined on opposing sides of the principal meridional line. A part of the principal meridional line in the progressive area and the reading area is shifted to the nose-side area from the center portion of the lens. A plurality of equi-astigmatism curves are arranged in the nose-side area and the ear-side area. Each equi-astigmatism curve is formed by an astigmatism, and each astigmatisms have substantially the same value. Astigmatism increases as the each equi-astigmatism curve is moved away from the principal meridional line into the nose-side area and the ear-side area. In at least one of the progressive area and the reading area, the equi-astigmatism curves in the ear-side area are asymmetrical to those in the nose-side area, and an increase in astigmatism in the nose-side area is smaller than an increase in astigmatism in the ear-side area. Distortion in the nose-side area is smaller than the distortion in the ear-side area in at least one of the progressive area and the reading area.

In another aspect of the invention, a progressive focal lens includes a distance area located at an upper portion of the lens, a reading area located at a lower portion of the lens, a progressive area located between the distance area and the reading area, and a principal meridional line extending vertically at a center portion of the lens and crossing the distance area, the reading area and the progressive area. A nose-side area and an ear-side area are defined on opposing sides of the principal meridional line. A part of the principal meridional line in the progressive area and the reading area is shifted to the nose-side area from the center portion of the lens. A plurality of equi-astigmatism curves are arranged in the nose-side area and the ear-side area. Each equi-astigmatism curve is formed by an astigmatism, and each of the astigmatisms have substantially the same value. Astigmatism increases as the each equi-astigmatism curve is moved away from the principal meridional line into the nose-side area and the ear-side area. In at least one of the progressive area and the reading area, the equi-astigmatism curves in the nose-side area are substantially symmetrical to those in the ear-side area. Distortion in the nose-side area is smaller than the distortion in the ear-side area at least in one of the progressive area and the reading area.

In yet another aspect of the invention, a progressive focal lens includes a distance area located at an upper portion of the lens, a reading area located at a lower portion of the lens, a progressive area located between the distance area and the reading area, and a principal meridional line extending vertically at a center portion of the lens and crossing the distance area, the reading area and the progressive area. A nose-side area and an ear-side area are defined an opposing side of the principal meridional line. A part of the principal meridional line in the progressive area and the reading area is shifted to the nose-side area from the center portion of the lens. A plurality of equi-astigmatism curves are arranged in the nose-side area and the ear-side area, and each equi-astigmatism curve is formed by an astigmatism. Each astigmatisms has substantially the same value. Astigmatism increases as the each equi-astigmatism curve is moved away from the principal meridional line into the nose-side area and the ear-side area, and in at least one of the progressive area and the reading area. The equi-astigmatism curves in the ear-side area are asymmetrical to those in the nose-side area, and an increase in astigmatism in the nose-side area is smaller than an increase in astigmatism in the ear-side area. Distortion in the nose-side area is substantially symmetrical to the distortion in the ear-side area in at least one of the progressive area and the reading area.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
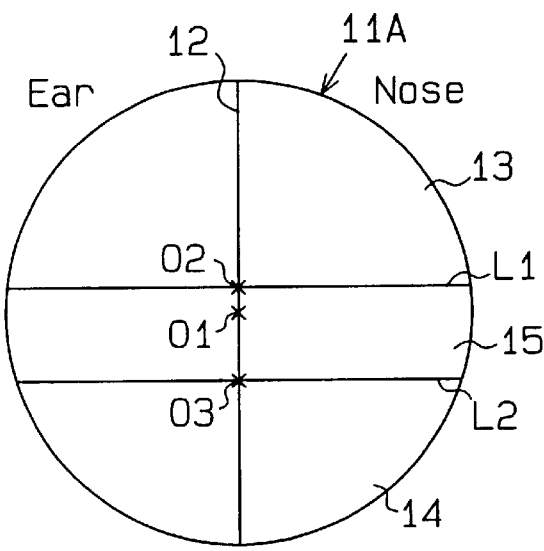
FIG. 1 is a schematic front view of a typical progressive focal lens.
Figure 2:
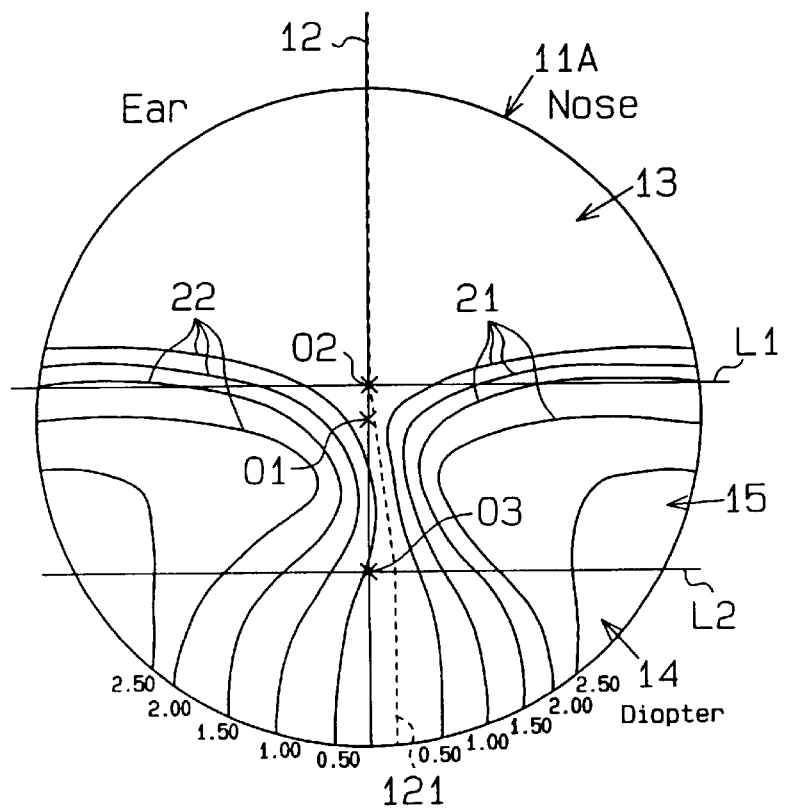
FIG. 2 is a schematic front view of a first prior arr progressive focal lens.
Figure 3:
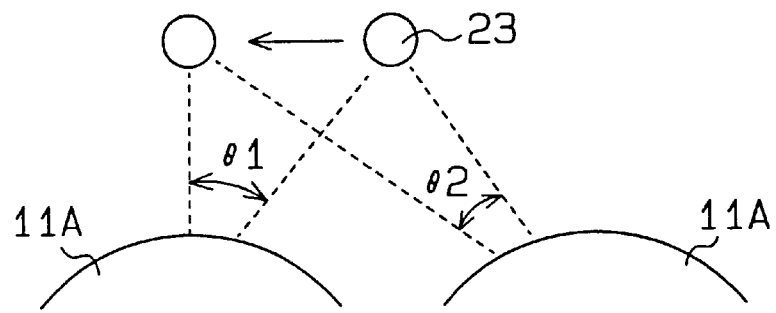
FIG. 3 is a plan view showing the lens of FIG. 2 being used.
Figure 4:
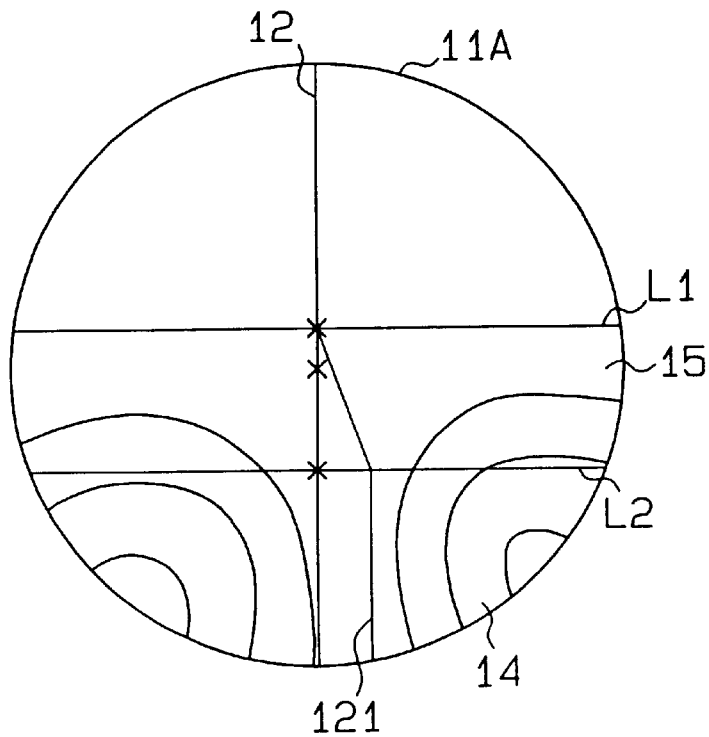
FIG. 4 is a front view of a second prior art progressive focal lens.
Figure 5:
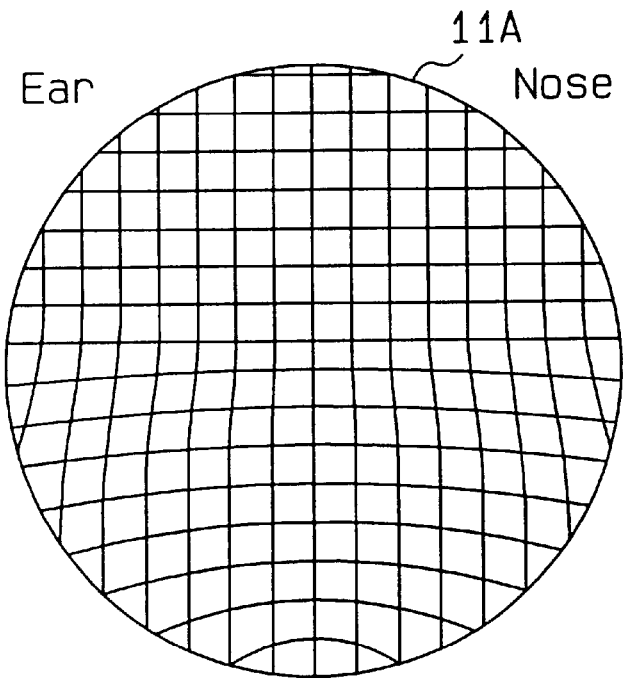
FIG. 5 is a front view depicting the distortion of the lens of FIG. 4.
Figure 6:
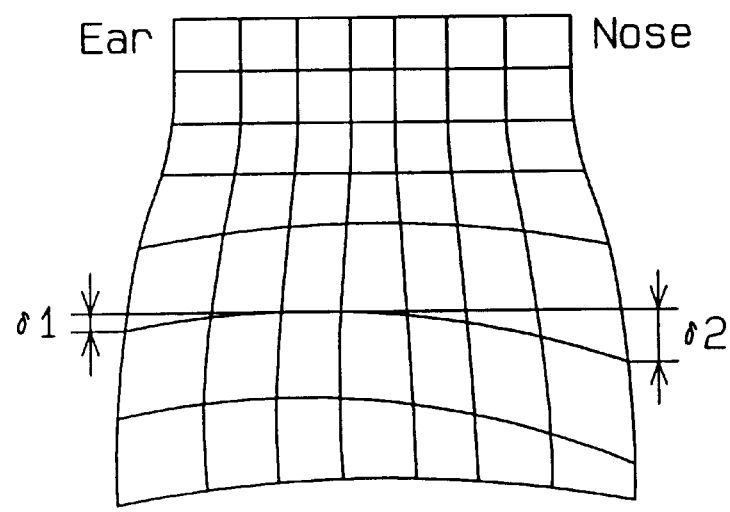
FIG. 6 is a partly enlarged front view showing the distortion of the lens of FIG. 4.

In the following detailed description, like or same reference numerals are given to those components which are the same as the corresponding components of the above-described prior art.

Figure 7:
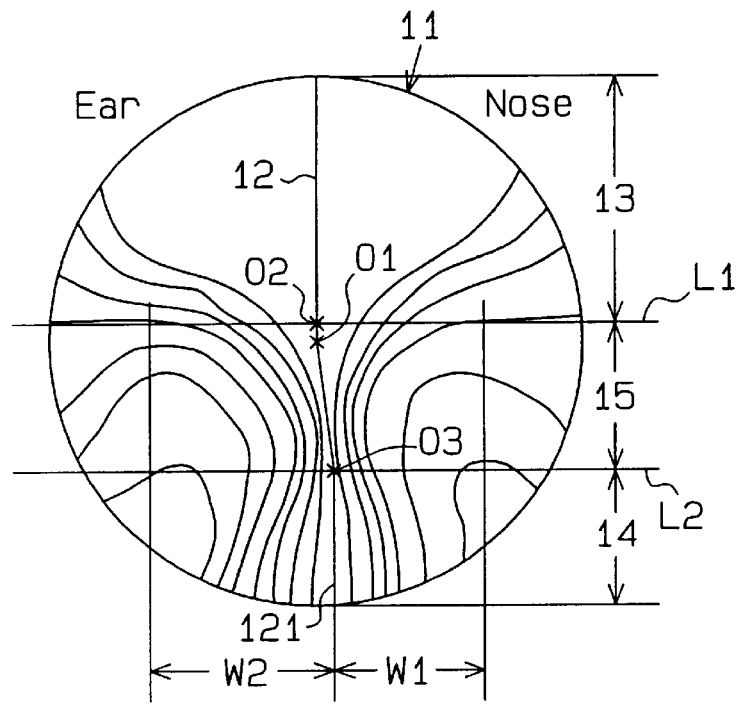
FIG. 7 is a front view of a progressive focal lens according to a first embodiment of the present invention.

As shown in FIG. 7, a lens 11 according to a first embodiment of the present invention has a principal meridional line 12 whose part in a progressive area 15 and a reading area 14 is shifted by a predetermined distance toward the nose-side area. This part of the principal meridional line 12 is referred to as the principal meridional line 121.

A geometric center 01 of the lens 11 is provided on the principal meridional line 121, and a distance point 02 is provided above the geometric center 01. A distance area 13 is defined above a first horizontal line L1 that passes through the distance point 02. The distance area 13 has a spherical shape or a near spherical shape. A reading point 03 is provided below the geometric center 01. The reading area 14 is defined below a second horizontal line L2 that passes through the reading point 03. The progressive area 15 is defined between the lines L1 and L2. The progressive area 15 has an aspherical shape whose curvature gradually changes from the curvature of the distance area 13 to the curvature of the reading area 14.

The principal meridional line 121 in the progressive area 15 and the reading area 14 is shifted toward the nose side in consideration of convergence by which right and left eyes come close to each other at the time of viewing a near object.

A plurality of curves are equi-astigmatism curves which are expressed by points with equal astigmatism. As apparent from the curves, the distribution of astigmatism on the ear side is asymmetrical to the distribution of astigmatism on the nose side with the principal meridional line 121 in between. This asymmetry is prominent in the progressive area 15 and the reading area 14.

Figure 8:
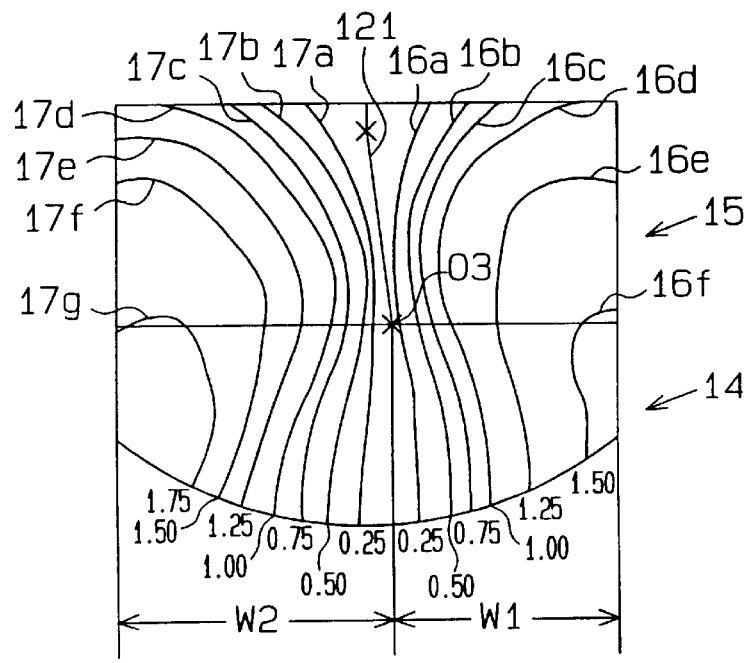
FIG. 8 is an enlarged partial front view showing the distortion of the lens of FIG. 7.

FIG. 8 is an enlarged, partial view of the progressive area 15 and the reading area 14. The area denoted W1 represents the effective progressive and reading areas on the nose side of the lens 11, and the area denoted W2 represents the effective progressive and reading areas on the ear side of the lens 11. That is, those areas outside the areas W1 and W2 are less used and also may be used to fit the lens 11 within an eyeglass frame 33 (see FIG. 13).

Referring to equi-astigmatism curves 16a to 16f on the nose side and equi-astigmatism curves 17a to 17g on the ear side in FIG. 8, astigmatism in the progressive area 15 directed toward the nose side from the principal meridional line 121 increases more slowly than astigmatism directed toward the ear side. That is, there are six equi-astigmatism curves 16a–16f, and there are seven equi-astigmatism curves 17a–17g. This shows that astigmatism in the progressive area 15 on the nose side increases slowly. Astigmatism in the reading area 14 on the nose side also increases slowly.

In this specification, a slow increase in astigmatism includes a slow increase in astigmatism over the entire effective progressive and reading areas W1 or a slow increase in astigmatism in the main portions of the area W1.

In this first embodiment, when the reading area is 2.0 dpt, the astigmatism of the equi-astigmatism curve 16f is 1.5 dpt, the largest among astigmatisms on the nose side. Further, the astigmatism of the equi-astigmatism curve 17g is 1.75 dpt, the largest among astigmatisms on the ear side. In the area that is within about 15 mm toward both the ear side and the nose side from the principal meridional line 121, therefore, the maximum value of the astigmatism on the ear side is greater than that on the nose side. According to this embodiment, in the area that lies beyond the 15 mm range on both the ear side and the nose side from the principal meridional line 121, the maximum value of the astigmatism on the nose side is greater than that on the ear side. That is, the area outside the 15 mm range is not actually used as a lens for eyeglasses. It is therefore preferable to design the lens such that astigmatism having a large value is focused on that area.

Figure 13:
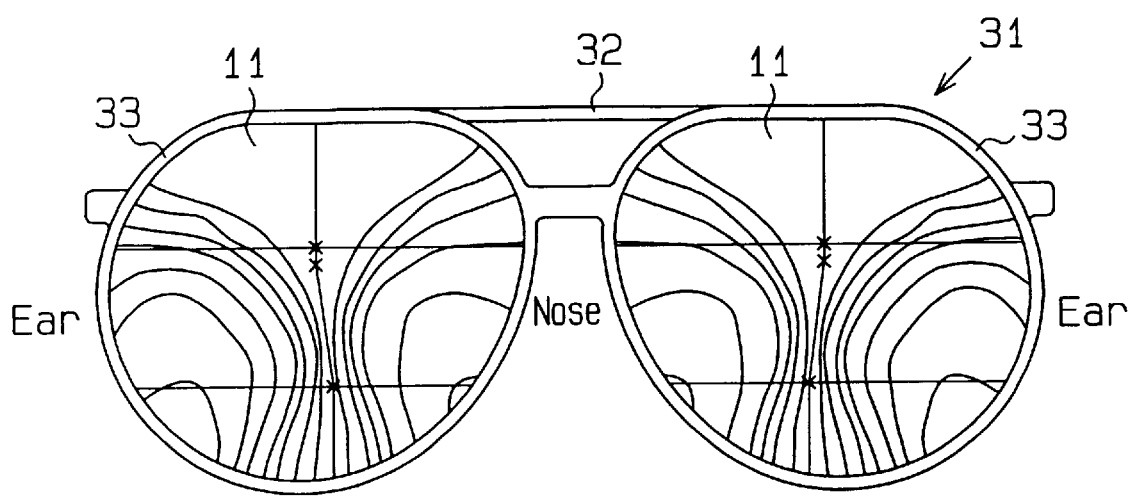
FIG. 13 is a front view of a pair of eyeglasses with the lenses of FIG. 7.

In this specification, the effective progressive and reading areas W1 and W2 mean those areas that allow the wearer to see an object through the lenses 11 fitted in rings 33 of eyeglasses (FIG. 13). As the shape of the rings 33 varies, however, the lens portions outside the effective progressive and reading areas W1 and W2 may be located within the rings 33. The effective progressive and reading areas thus includes the actual areas of the lens that are used when the wearer is viewing objects along the line of sight.

It is preferable that the equi-astigmatism curves in the distance area 13 (FIG. 7) are arranged asymmetrical with the principal meridional line 121 therebetween and the corridor of clear vision on the ear side is wider than that on the nose side. The clear vision area is an area with astigmatism of 0.5 dpt or smaller in which the wearer can empirically see an object without blur. The clear vision area, when accurately expressed as the shape of the refractive surface of the lens, is given as follows:

$$(n-1) \times |C1-C2| \leq 0.5 \text{ (dpt)}$$

where n is a refractive index of the lens material, and C1 and C2 are principal curvatures (unit:$m^{-1}$) in different directions at a given point on the refractive surface of the lens in the clear vision area.

Due to the clear vision area on the ear side being wider than that on the nose side, objects can be seen over a wide range through the distance area.

Figure 9:
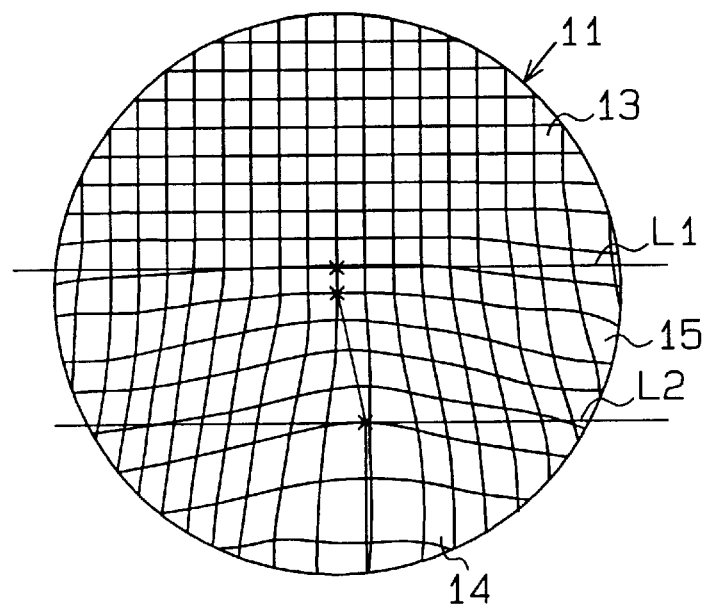
FIG. 9 is a front view depicting the distortion of the lens of FIG. 7.
Figure 10:
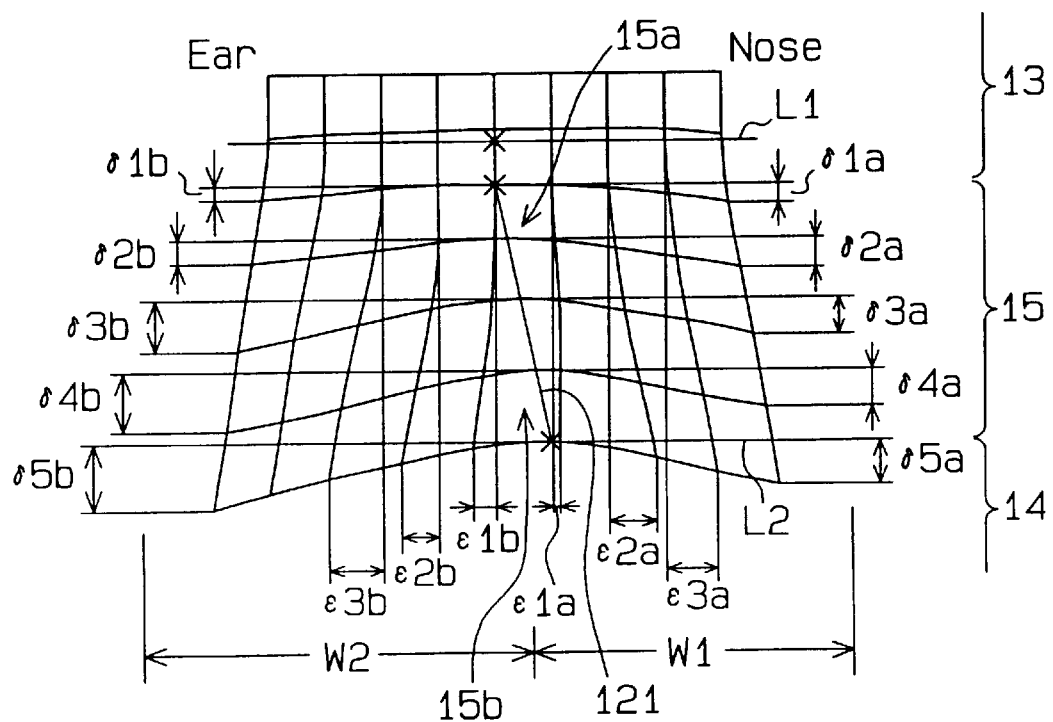
FIG. 10 is a partly enlarged front view showing the distortion of the lens of FIG. 7.

FIG. 9 shows a distorted image of the lens 11 using longitudinal and lateral lines. FIG. 10 is an enlarged diagram of the effective progressive and reading areas W1 and W2 of the progressive focal lens 11. The progressive area 15 has an upper narrow area 15a and a lower wide area 15b. Vertical distortions $\delta 1a$ and $\delta 2a$ in the upper narrow area 15a on the nose side are slightly greater than distortions $\delta 1b$ and $\delta 2b$ on the ear side. Vertical distortions $\delta 3a$ and $\delta 4a$ in the lower wide area 15b on the nose side are smaller than distortions $\delta 3b$ and $\delta 4b$ on the ear side. Further, distortion $\delta 5a$ in the reading area 14 on the nose side is smaller than distortion $\delta 5b$ on the ear side.

Horizontal distortions $\epsilon 1a$, $\epsilon 2a$ and $\epsilon 3a$ in the progressive area 15 and the reading area 14 on the nose side become greater as a sample point is shifted toward the nose side from the principal meridional line 121, while horizontal distortions $\epsilon 1b$, $\epsilon 2b$ and $\epsilon 3b$ on the ear side become greater as the sample point is shifted toward the ear side from the principal meridional line 121. In other words, the lens 11 is designed such that horizontal distortions on the nose side and the ear side in the vicinity of the principal meridional line 121 are minimized. At the time of viewing an object through the area near the principal meridional line 121 which is most frequently used, therefore, horizontal distortion is suppressed.

Figure 11:
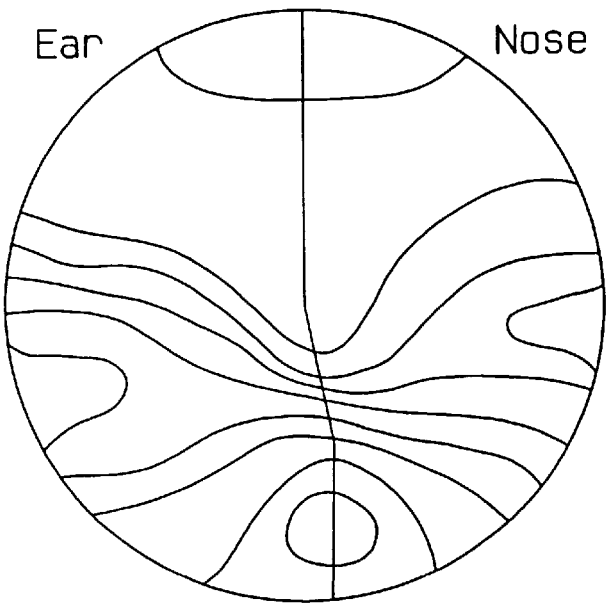
FIG. 11 is a front view illustrating the vertical curvature of the lens of FIG. 7.
Figure 12:
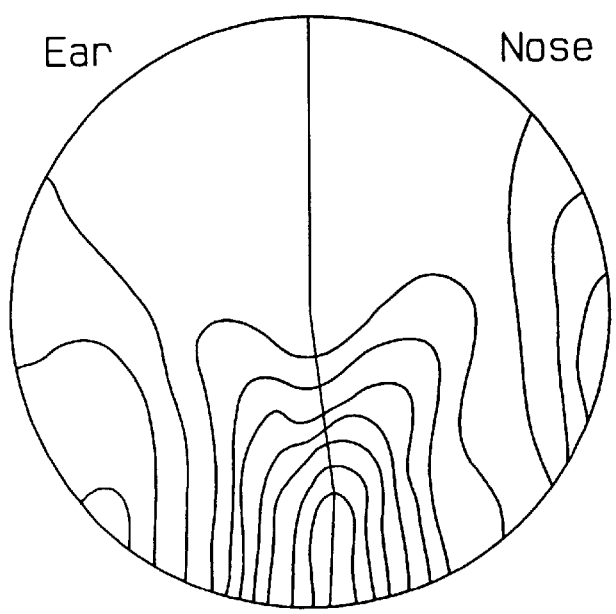
FIG. 12 is a front view illustrating the horizontal curvature of the lens of FIG. 7.

FIG. 11 is a diagram showing a plurality of curves of equi-vertical curvature in the progressive focal lens 11, and FIG. 12 is a diagram showing a plurality of curves of equi-horizontal curvature.

Table 1 shows specific values of the curvature curves in FIGS. 11 and 12.

The values in Table 1 indicate the horizontal curvatures. As a specific example, at the geometric center 01 with the horizontal coordinate X=0 and the vertical coordinate Y=0, the radius of curvature is 0.523/4.35=0.12023 (m) and the curvature is 1/0.12023=8.3174 (1/m). In this example, the lens material preferably has a refractive index of 1.6, and a lens having addition of 2.00 dpt and a 4.35 curve (equivalent to a refractive index of 1.523) is used.

|  | Hor. | | | | | |
| --- | --- | --- | --- | --- | --- | --- |
| Ver. | 0 [mm] | 5 [mm] | 10 [mm] | 15 [mm] | 20 [mm] | 25 [mm] |
| 0 Nose | 8.3174 | 8.5086 | 8.8528 | 8.5277 | 8.8528 | 9.6558 |
| [mm] Ear | 8.3174 | 8.4704 | 8.4321 | 8.0497 | 7.8394 | 7.8011 |
| −5 Nose | 8.9101 | 9.3881 | 9.1396 | 8.4130 | 8.9393 | 9.9426 |
| [mm] Ear | 8.9101 | 9.0249 | 8.6042 | 7.7820 | 7.4761 | 7.6099 |
| −10 Nose | 10.3633 | 10.0000 | 8.8719 | 8.3748 | 8.9101 | 10.1721 |
| [mm] Ear | 10.3633 | 9.9809 | 8.6042 | 7.6673 | 7.3423 | 7.3996 |
| −15 Nose | 11.5870 | 10.3824 | 8.9293 | 8.5280 | 8.6424 | 10.7648 |
| [mm] Ear | 11.5870 | 10.3633 | 8.6424 | 7.6482 | 7.1128 | 7.2467 |
| −20 Nose | 11.6635 | 10.5545 | 9.0440 | 8.6042 | 8.4130 | 11.1281 |
| [mm] Ear | 11.6635 | 10.5163 | 8.8145 | 7.7055 | 7.0363 | 7.3040 |

[unit: 1/m]

FIG. 13 is a diagram showing a pair of eyeglasses 31 for both hyperopic and myopic usage which comprise an eyeglass frame 32 and progressive focal lenses 11 fitted in rings 33 of the frame 32. The progressive focal lens 11 is fitted in the associated ring 33 after being cut into a predetermined shape.

The lens 11 of this embodiment provides the following advantages.

1) The astigmatism in the effective progressive and reading areas W1 on the nose side increases more slowly than the astigmatism in the effective progressive and reading areas W2 on the ear side. Blurring or distortion of the image of an object in the effective progressive and reading areas W1 on the nose side are therefore suppressed. This embodiment is particularly effective in a case of seeing the object, located in front of the face along the line of sight, with both eyes using the effective progressive and reading areas W1 of the two lenses on the nose side.

Due to a slow increase in astigmatism in the effective progressive and reading areas W1 on the nose side, relatively large astigmatism appears at a peripheral portion of the lens 11 outside the effective progressive and reading areas W1. As this peripheral portion is cut away at the time each lens 11 is fitted in to the frame 32, its effect on near vision is minimal.

2) In the progressive area 15 and the reading area 14, the vertical distortions δ3a to δ5a on the nose side are smaller than the vertical distortions δ3b to δ5b on the ear side. The vertical distortions of the image of the object in the effective areas W1 on the nose side are suppressed.

3) The vertical distortions δ1a and δ2a on the nose side in the upper narrow area 15a of the progressive area 15 are slightly greater than the vertical distortions δ1b and δ2b on the ear side. Further, the vertical distortions δ3a to δ5a on the nose side in the lower wide area 15b of the progressive area 15 are smaller than the vertical distortions δ3b to δ5b on the ear side. The vertical distortions of the image of the object in the effective progressive area W1 on the nose side are suppressed efficiently. That is, the rate of increase of the distortions δ1a–δ5a in the effective progressive area W1 on the nose side become smaller, thus suppressing the feeling of reeling of the object at the time the line of sight is shifted up and down in the effective progressive area 15.

4) The vertical distortion on the nose side in the reading area 14 is smaller than the vertical distortion on the ear side. Thus, only the vertical distortion of the image of the object in the reading area on the nose side is suppressed, thus suppressing the feeling of reeling of the object at the time the line of sight is shifted up and down.

It should be apparent to those skilled in the art that the present invention may be embodied in many other specific forms without departing from the spirit or scope of the invention. Particularly, it should be understood that the invention may be embodied in the following forms.

In FIG. 7, the equi-astigmatism curve 16f having the maximum astigmatism in the nose-side area may be shifted rightward toward the periphery of the lens 11.

The lens 11 may be designed in such that the vertical distortion on the nose side becomes smaller than the vertical distortion on the ear side over the entire progressive area 15.

Figure 14:
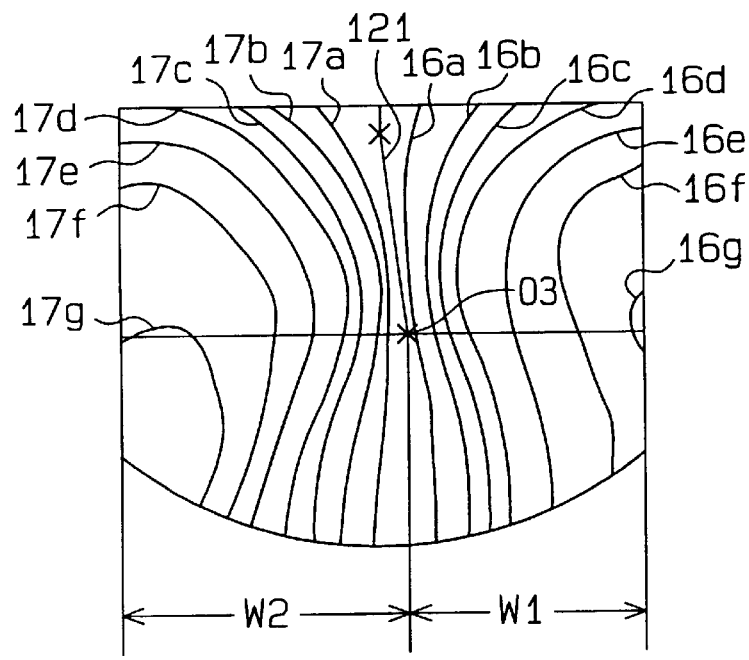
FIG. 14 is an enlarged partial front view of a progressive focal lens according to a second embodiment of the present invention.

As shown in FIG. 14, the equi-astigmatism curves on the ear side may be arranged substantially symmetrical to those on the nose side in the progressive area 15 with the principal meridional line 121 therebetween, and the distortion on the nose side may be set smaller than the distortion on the ear side. In this case, the feeling of reeling of an object at the time the line of sight is shifted up and down in the progressive area 15 is suppressed.

Figure 15:
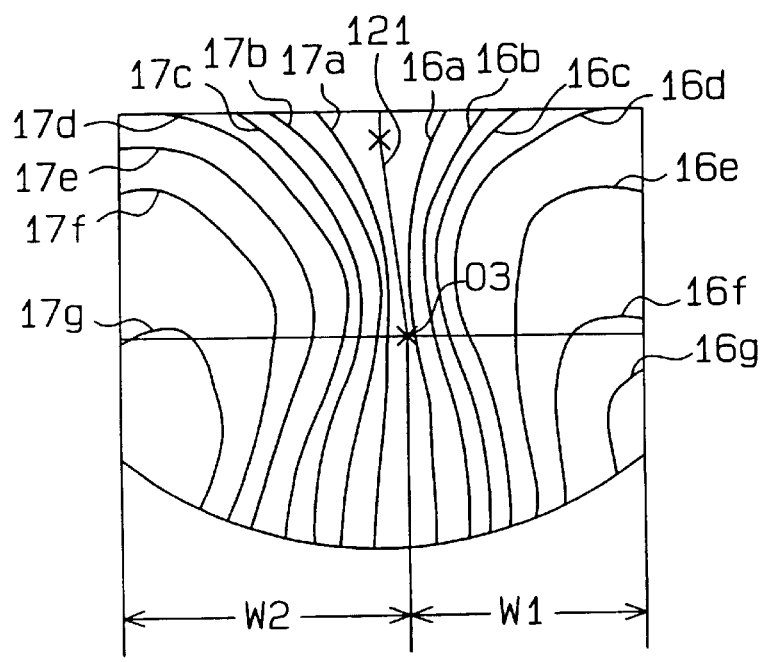
FIG. 15 is an enlarged partial front view of a typical progressive focal lens according to a third embodiment of the present invention.

As shown in FIG. 15, the equi-astigmatism curves on the ear side may be arranged substantially symmetrical to those on the nose side in the reading area 14 with the principal meridional line 121 therebetween, and the distortion on the nose side may be set smaller than the distortion on the ear side. In this case, the feeling of reeling of an object at the time the line of sight is shifted up and down in the reading area 14 is suppressed.

Figure 16:
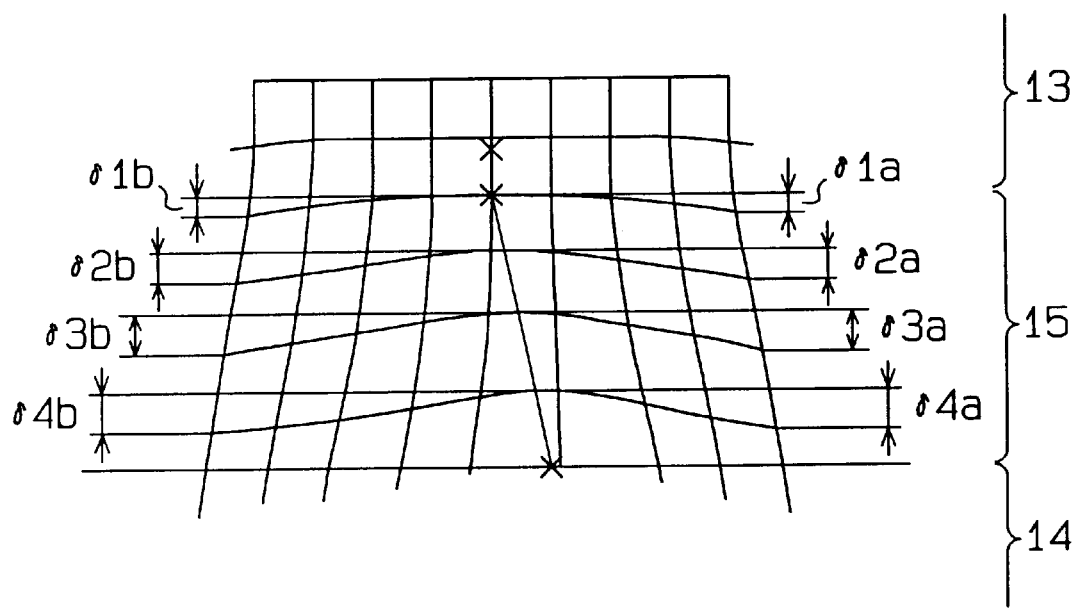
FIG. 16 is an enlarged partial front view showing the distortion of a progressive focal lens according to a fourth embodiment of the present invention.

The equi-astigmatism curves on the ear side may be arranged substantially asymmetrical to those on the nose side only in the progressive area 15 with the principal meridional line 121 therebetween, and the astigmatism on the nose side may increase more slowly than the astigmatism on the ear side. Further, as shown in FIG. 16, the distortions in the progressive area 15 on the nose side may be set substantially symmetrical to those on the ear side with the principal meridional line 121 in between. In this case, blurring of the image of an object in the effective progressive area W1 in the progressive area 15 on the nose side is suppressed.

Figure 17:
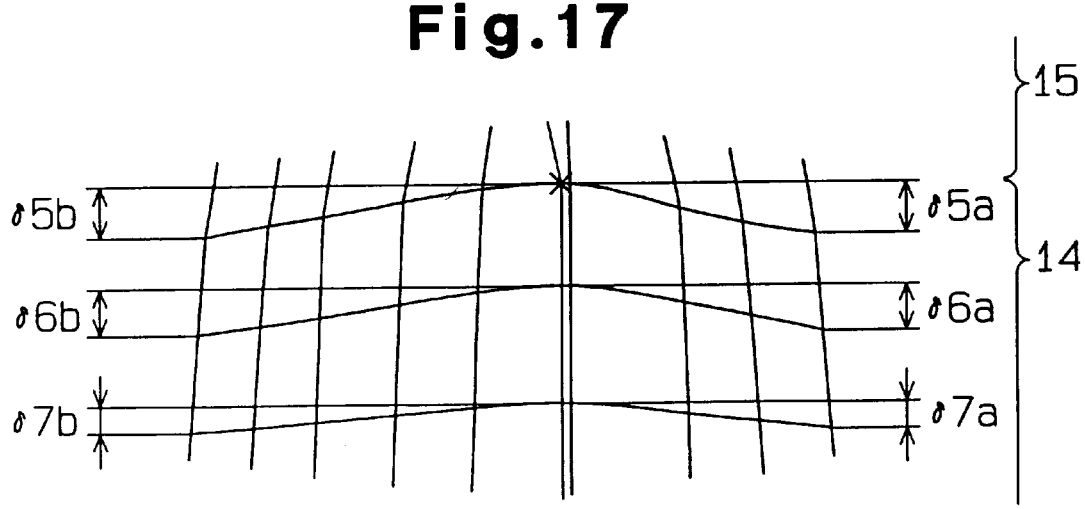
FIG. 17 is an enlarged partial front view showing the distortion of a progressive focal lens according to a fifth embodiment of the present invention.

The equi-astigmatism curves on the ear side may be arranged substantially asymmetrical to those on the nose side only in the reading area 14 with the principal meridional line 121 in between, and the astigmatism on the nose side may increase more slowly than the astigmatism on the ear side. Further, as shown in FIG. 17, the distortions in the reading area 14 on the nose side may be set substantially symmetrical to those on the ear side with the principal meridional line 121 in between. In this case, blurring of the image of an object in the effective progressive area W1 in the reading area 14 on the nose side is suppressed.

Therefore, the present examples and embodiments are to be considered as illustrative and not restrictive and the invention is not to be limited to the details given herein, but may be modified within the scope and equivalence of the appended claims.

What is claimed is:

1. A progressive focal lens comprising:
   a distance area located at an upper portion of said lens;
   a reading area located at a lower portion of said lens;
   a progressive area located between said distance area and said reading area;
   a principal meridional line extending vertically at a center portion of said lens and crossing said distance area, said reading area and said progressive area, a nose-side area and an ear-side area being defined on opposing sides of said principal meridional line, a part of said principal meridional line in said progressive area and said reading area being shifted to said nose-side area from said center portion of said lens; and
   a plurality of equi-astigmatism curves arranged in said nose-side area and said ear-side area, wherein an astigmatism increases as said each equi-astigmatism curve is move away from said principal meridional line into said nose-side area and said ear-side area, and in at least one of said progressive area and said reading area, said equi-astigmatism curves in said ear-side area are asymmetrical to those in said nose-side area, and an increase in astigmatism in said nose-side area is smaller than an increase in astigmatism in said ear-side area, wherein a distortion occurs in said nose-side area and said ear-side area, and the distortion in said nose-side area is smaller than the distortion in said ear-side area in at least one of said progressive area and said reading area.

2. The progressive focal lens according to claim 1, wherein said distortion includes vertical distortion, and vertical distortion in said nose-side area is smaller than vertical distortion in said ear-side area.

3. The progressive focal lens according to claim 1, wherein said progressive area includes an upper narrow area and a lower wider area, said distortion includes vertical distortion, and vertical distortion in said nose-side area is slightly larger than vertical distortion in said ear-side area in said upper narrow area and vertical distortion in said nose-side area is smaller than vertical distortion in said ear-side area in said lower wide area and said reading area.

4. The progressive focal lens according to claim 1, wherein a maximum value of astigmatism in a part of said ear-side area located within about 15 mm from said principal meridional line is greater than a maximum value of astigmatism in a part of said nose-side area located within about 15 mm from said principal meridional line.

5. The progressive focal lens according to claim 1, wherein a maximum value of astigmatism in a part of said nose-side area located more than about 15 mm away from said principal meridional line is greater than a maximum value of astigmatism in a part of said ear-side area located more than about 15 mm away from said principal meridional line.

6. The progressive focal lens according to claim 1, further including a clear vision area, wherein said clear vision area in said ear-side distance area is wider than that in said nose-side distance area.

7. Eyeglasses using a lens as recited in claim 1.

8. A progressive focal lens comprising:
   a distance area located at an upper portion of said lens;
   a reading area located at a lower portion of said lens;
   a progressive area located between said distance area and said reading area;
   a principal meridional line extending vertically at a center portion of said lens and crossing said distance area, said reading area and said progressive area, a nose-side area and an ear-side area being defined on opposing sides of said principal meridional line, a part of said principal meridional line in said progressive area and said reading area being shifted to said nose-side area from said center portion of said lens; and
   a plurality of equi-astigmatism curves arranged in said nose-side area and said ear-side area, wherein an astigmatism increases as said each equi-astigmatism curve is move away from said principal meridional line into said nose-side area and said ear-side area, and in at least one of said progressive area and said reading area, said equi-astigmatism curves in said nose-side area are substantially symmetrical to those in said ear-side area, wherein a distortion occurs in said nose-side area and said ear-side area, and the distortion in said nose-side area is smaller than the distortion in said ear-side area at least in one of said progressive area and said reading area.

9. The progressive focal lens according to claim 8, wherein said distortion includes vertical distortion, and vertical distortion in said nose-side area is smaller than vertical distortion in said ear-side area.

10. The progressive focal lens according to claim 8, wherein said progressive area includes an upper narrow area and a lower wider area, said distortion includes vertical distortion, and vertical distortion in said nose-side area is slightly larger than vertical distortion in said ear-side area in said upper narrow area and vertical distortion in said nose-side area is smaller than vertical distortion in said ear-side area in said lower wide area and said reading area.

11. The progressive focal lens according to claim 8, wherein a maximum value of astigmatism in a part of said ear-side area located within about 15 mm from said principal meridional line is greater than a maximum value of astigmatism in a part of said nose-side area located within about 15 mm from said principal meridional line.

12. The progressive focal lens according to claim 8, wherein a maximum value of astigmatism in a part of said nose-side area located more than about 15 mm away from said principal meridional line is greater than a maximum value of astigmatism in a part of said ear-side area located more than about 15 mm away from said principal meridional.

13. The progressive focal lens according to claim 8, further including a clear vision area, wherein said clear vision area in said ear-side distance area is wider than that in said nose-side distance area.

14. Eyeglasses using a lens as recited in claim 8.

15. A progressive focal lens comprising:
   a distance area located at an upper portion of said lens;
   a reading area located at a lower portion of said lens;
   a progressive area located between said distance area and said reading area;
   a principal meridional line extending vertically at a center portion of said lens and crossing said distance area, said reading area and said progressive area, a nose-side area and an ear-side area being defined on opposing sides of said principal meridional line, a part of said principal meridional line in said progressive area and said reading area being shifted to said nose-side area from said center portion of said lens; and
   a plurality of equi-astigmatism curves arranged in said nose-side area and said ear-side area, wherein an astigmatism increases as said each equi-astigmatism curve is move away from said principal meridional line into said nose-side area and said ear-side area, and in at least one of said progressive area and said reading area, said equi-astigmatism curves in said ear-side area are asymmetrical to those in said nose-side area, and an increase in astigmatism in said nose-side area is smaller than an increase in astigmatism in said ear-side area, wherein a distortion occurs in said nose-side area and said ear-side area, and the distortion in said nose-side area is substantially symmetrical to the distortion in said ear-side area in at least one of said progressive area and said reading area.

16. The progressive focal lens according to claim 15, wherein a maximum value of astigmatism in a part of said ear-side area located within about 15 mm from said principal meridional line is greater than a maximum value of astigmatism in a part of said nose-side area located within about 15 mm from said principal meridional line.

17. The progressive focal lens according to claim 15, wherein a maximum value of astigmatism in a part of said nose-side area located more than about 15 mm away from said principal meridional line is greater than a maximum value of astigmatism in a part of said ear-side area located more than about 15 mm away from said principal meridional line.

18. The progressive focal lens according to claim 15, further including a clear vision area, wherein said clear vision area in said ear-side distance area is wider than that in said nose-side distance area.

19. Eyeglasses using a lens as recited in claim 15.

* * * * *

UNITED STATES PATENT AND TRADEMARK OFFICE
CERTIFICATE OF CORRECTION

PATENT NO. : 6,074,061
DATED : June 13, 2000
INVENTOR(S) : Hitoshi Miura

It is certified that error appears in the above-identified patent and that said Letters Patent is hereby corrected as shown below:

Assignee: Tokai Kogaku Kabushiki Kaisha

Signed and Sealed this

Seventeenth Day of April, 2001

Attest:

NICHOLAS P. GODICI

*Attesting Officer*   *Acting Director of the United States Patent and Trademark Office*